Aug. 15, 1967 D. L. ATHERTON 3,336,548

MEANS FOR REDUCING EDDY CURRENT LOSSES IN SUPERCONDUCTING CIRCUITS

Filed Nov. 9, 1964

INVENTOR.
DAVID L. ATHERTON
BY Westell & Hanley
PATENT AGENTS

United States Patent Office 3,336,548
Patented Aug. 15, 1967

3,336,548

MEANS FOR REDUCING EDDY CURRENT LOSSES IN SUPERCONDUCTING CIRCUITS

David L. Atherton, Toronto, Ontario, Canada, assignor to Ferranti-Packard Electric Limited, Toronto, Ontario, Canada, a corporation of Canada Filed Nov. 9, 1964, Ser. No. 409,775
6 Claims. (Cl. 335—216)

This invention relates to means for and methods of obtaining magnetic fields and/or currents using superconducting materials and the invention is particularly directed at means of reducing certain losses in connection with such means and methods.

By superconducting materials are meant those materials which when cooled to temperature of approximately 0–20° K. (the temperature varies with the material), exhibit no measurable electrical resistance as long as adjacent magnetic fields are below certain values and as long as electric current therein is below certain values. (Such values for field and current vary with the material involved.) When a superconducting material is in a superconducting stage; it is, except for surface effects, impenetrable by magnetic flux, but when the material changes from a superconducting to a non-superconducting state (known as the "normal" state), at the same time it becomes penetrable by magnetic flux.

By "flux penetrable area" is implied, an area permeable by magnetic flux. By "normal" is meant the state of a part or all of a material which under proper conditions would be superconducting but is not, at the time of reference, in the superconducting state. In other words a superconducting material or part thereof may either be in the "superconducting" state or in the "normal" state.

The value of magnetic field at 0° K. at which superconducting material becomes normal is known as the "critical field," and it will be appreciated that the value of the critical field must be obtained by extrapolation from experimental results at other temperatures, since the temperature 0° K. is not attainable. The temperature at zero magnetic field, above which superconducting material becomes normal is known as the "critical temperature." Although these are the proper definitions, of the terms "critical field" and "critical temperature," for convenience herein, the term "critical field" is used to refer to the field above which the superconducting material will become normal at the then ambient temperature, while the term "critical temperature" is used to refer to the temperature at which superconducting material becomes normal in a given field.

With bodies made of superconducting materials or alloys, it is found, in some cases, that for currents in the body above a certain value, the body goes normal even though the ambient temperature and field are below their critical values. The current value at which this takes place is known as the critical current.

It is known that if superconducting material in superconducting state surrounds a flux penetrable area, then any flux passing through the area cannot escape or dissipate while the material in superconducting state forms a closed circuit about the area. Moreover, it is known that if a part of such enclosing superconducting material is a body of sufficient dimensions, then the additional magnetic field of a magnetic field source may, in the proper conditions of existing field and temperature, be used to create a localized normal area in the body when the proximity of the magnetic source and the strength of its field are sufficient to raise the field in the localized area above the critical field value. Through such localized normal area, the magnetic flux paths may pass, under the conditions described hereafter. With the source in proper proximity to create such a normal area, the area may be moved from one edge of the superconducting body (external to the superconducting circuit) to another, internal to the superconducting circuit, whereby the flux associated with the magnet may be added to that already "trapped" within the aforesaid closed superconducting circuit. If the dimensions of the superconducting body are sufficient that the normal area never completely breaks the superconducting connection supplied by the body to the closed circuit; and if the fields about and the currents in the superconductors are below the critical level for the superconducting materials and the dimensions thereof (including the superconducting portion of the body during the travel of the localized normal area thereacross); then an existing field, extending through the area enclosed by the superconducting circuit, may be increased or decreased (depending on the relative polarities of the two fields) by the field brought in with the movable magnetic source. The increase (or decrease) in field will be sustained if the magnetic source can then be moved to a position where it creates a field pattern again external to the superconducting circuit, without rendering a part of the encircling superconductor normal during such last mentioned movement; and the current in the closed superconducting circuit will, as a result, be lorrespondingly altered to a value to sustain the new entrapped field value. The process may be repeated, and the limits for such trapped field for a given temperature and material are determined by the critical field and/or the qualities, geometry and dimensions of the superconducting material.

It is now well known to provide a superconducting current or field generator which will include a superconducting circuit comprising a loop of superconducting material and a superconducting body, generally of a different superconducting material from that of the loop, with such circuit maintained during operation at superconducting temperatures. A magnetic field movable, as by the magnet described above, relative to the superconducting circuit, is moved cyclically over the body and over another part of the circuit and the materials and dimensions of the body and the loop are chosen so that a normal area, caused by the magnet, smaller than the dimensions of the body faced by the nearer magnet pole, travels in a path across the body and between the inside and outside of the circuit and then travels in the opposite direction (relative to the inside and outside of the loop) across another part of the superconductor circuit. Because the superconducting circuit is always complete, regardless of the position of the normal area, and because the circuit is not rendered normal when the field travels over another part of the superconducting circuit than the body (either because of a change in the field proximity to the superconducting circuit or because the body is of different material from the remainder of the loop), the cyclic operation may be used to cause an increase or a decrease in the field, held within the superconducting circuit, and hence in the current flowing thereabout. The device is useful as a DC generator and has been considered in a number of places for this use including my co-pending application Ser. No. 394,912, filed Sept. 8, 1964. Such a device is also commonly used in producing relatively high density fields and may also have application as a DC motor where a current in the superconducting circuit, supplied from elsewhere, is caused to provide relative movement between the body and the magnetic field.

Although such a superconducting body will in general be connected to a complete superconducting circuit, it will be appreciated that the superconducting body (usually when forming part of a DC generator) can be connected to a resistive load circuit and that the maximum currents which can in the latter event be generated will be limited to a value at which the rate of dissipation of energy in the resistive load balances the generator's production.

In these applications and in others where the relatively movable magnetic field causes a relatively moving normal spot to move across the body it has been found that in addition to the field sustaining currents flowing about the loop, and the Faraday currents caused by the movement of the magnetic field relative to the superconductors; that there are in addition eddy currents caused to flow about the normal spot and that some of this eddy current flow will take place through a part of the normal spot itself. While the flow of current through a superconducting circuit incurs no resistive loss, it will be appreciated that the flow of such an eddy current through the normal spot will result in a resistive loss. While at slow relative speeds between the normal spot and the magnetic field creating it, on the one hand; and the superconducting body on the other hand, these losses are negligible, it has been found that at rapid relative speeds of operation these losses become substantial and lower the overall efficiency of the device.

It is therefore an object of this invention to provide a device wherein the eddy current losses connected with the movement of a normal spot across a superconducting body in a superconducting circuit, are reduced.

It is a further object of this invention, to cause a reduction in such currents as described in the preceding paragraph, by providing gaps of insulating media in the superconducting body dividing it into strips which gaps impede flow in the body in a direction transverse to the normal superconducting flow around the circuit, but wherein the design of the superconducting body allows the strips to be connected in the superconducting circuit at both ends.

It is an object of this invention to provide a structure to accomplish the purposes of the second preceding paragraph, wherein an insulating media is used as a divider and the body is divided thereby into strips, dimensioned so that they are of a shorter dimension than the normal spot (as determined by the proximity of the magnet to the body, the strength of the magnet and the type of superconducting material forming the body) when both are measured in the direction of movement of the spot relative to the body but of a longer dimension than such normal spot in a direction transverse thereto but wherein said strips are connected at both ends in said superconducting circuit.

By "insulating media" I include not only normal insulating materials, but also materials with high resistance (such as stainless steels) and also liquid or gaseous helium which may in this invention be used to separate portions of the superconducting body from each other where cuts or slots are provided in the superconducting body.

In drawings which illustrate a preferred embodiment of the invention:

Figure 1:
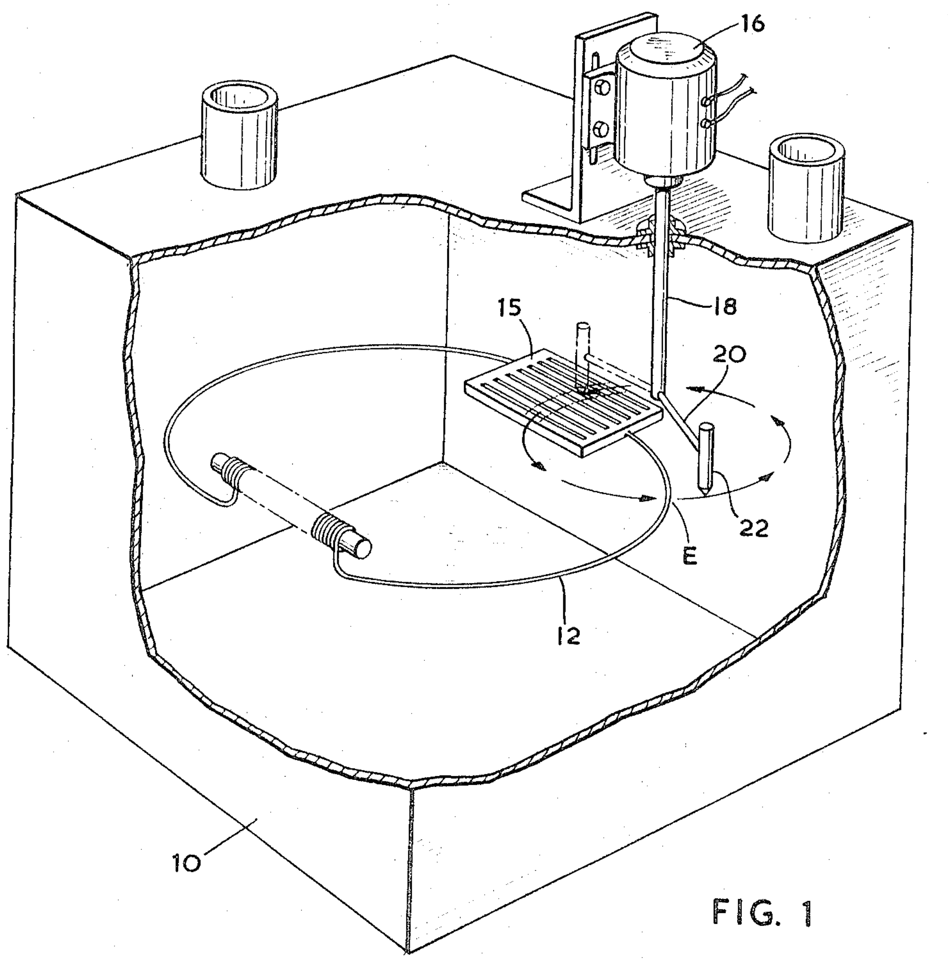
FIGURE 1 shows the invention in use.

In the drawing is shown a helium tank 10 adapted to produce the necessary temperatures to produce superconductivity in superconducting materials.

Suitably supported in tank 10 by a means not shown, is provided a superconducting circuit comprising an extent of superconductor 12 which includes (but in other applications would not include) a helical coil 14 joined at each end to a superconducting body which is preferably a sheet 15 made of lead, niobium, tantalum, or another material which in superconducting state could, in a localized area, be rendered normal by a localized magnetic field which can in such area create a localized field, higher than the then critical field value of the sheet.

The superconducting circuit extent 12, outside of the body, may be of any superconducting material which is not easily rendered normal and is preferably niobium stannide.

Figure 2:
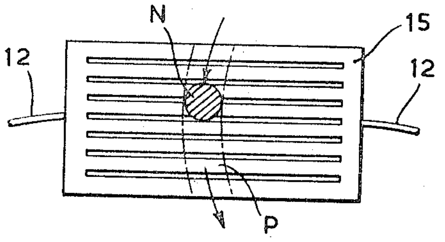
FIGURE 2 shows one element of the design in FIGURE 1.

In FIGURE 1 there is shown a motor 16 on the outside of the tank driving a shaft 18 which would be of as low heat conductivity as possible, projecting into said tank. A radial arm 20 projecting from the lower end of said shaft, carries a permanent magnet 22 thereon, in sufficient proximity to the sheet 15 that the field from the magnet 22 will create a normal area N shown in FIGURE 2, as the magnet travels over the sheet. In this way with rotation of the arm 20 in the direction shown, flux will be carried by the magnet 22 along the path P of the normal area, as it passes across the sheet 15 along the path P and eventually into the space surrounded by the superconducting circuit. When the magnet 22 passes out over the extent 12 of the superconducting circuit at E (FIGURE 1) outside of the body; the strength of the magnet 22, the material in extent 12 and the spacing between extent 12 and magnet 22, when the magnet is passing over point E, is adjusted so that the magnet field does not render this part of the circuit normal hence the flux carried in with the normal spot remains in the circuit, and such operation, tending to increase the flux contained in the superconducting circuit, may be repeated until the critical field or current values are reached.

It will be realized that, in other applications, the magnet may move in an opposite direction to carry flux outwardly over the sheet and other apparatus might be connected with the shaft than a motor. Also in other applications, the circuitry may take another form or there may be a plurality of circuits attached to the sheet as shown in our co-pending application Ser. No. 394,912. Whether there is a plurality of circuits or merely one, each circuit used will have a connection to each end of the sheet shown in this application, and directions between corresponding connections will define a general direction or a mean direction for current flow across the sheet 12 (the current referred to here being that part of current flowing across the sheet) which is flowing about the circuit.

It will be realized that, this invention may be applied to any superconducting circuit which includes a body preferably in sheet form across which there moves a normal spot created by a magnetic field and that this circuit may have a number of forms or functions. The circuit shown in the drawing, provided with a helical coil will be for the purpose of producing high magnetic fields along the axis of the coil, but other circuits might be used such as with a DC generator or possibly a motor which may also use the body having slots or gaps in accord with the invention.

Although in general the superconducting body 12 will be connected to a superconducting load, it may be connected to a resistive load.

The currents in the superconducting body 12 in a superconducting circuit across which a normal spot passes, created by a magnetic field, will include:

(a) Whether or not the field and a normal spot are in motion, when a field exists within the superconducting circuit, then the sustaining current, flowing about the circuit will flow across the body 12 between the connections on one side and the connections on the other side of body 12;

(b) When the magnet and its field are moving across the body, Faraday currents (as far as permitted by the contour of the body), are created, mutually perpendicular to the direction of the field and to the direction of relative movement between body and field. Such currents will travel across the body approximately perpendicular to the path P and will find a return path in another part of the body itself and/or the circuit.

(c) In addition, the movement of the field created by magnet 22 will create eddy currents in the body when the normal spot is located thereon. To a degree varying with the speed of the field across the body, such eddy currents will travel through the material in the normal portion and the resistive losses caused thereby also vary with the speed of the field relative to the body. It is these eddy current losses which the structure of the invention is designed to prevent.

Therefore in accord with the invention, the sheet is divided by an insulating media into strips extending roughly along or parallel to the line joining the connections which line will in fact be roughly along or parallel to the mean current flow part of the current flowing about the circuit.

The effect of the insulating media is to prevent eddy currents tending to flow about and through the normal spot, from completing a circuit in this manner because the normal path of the current is interrupted by the insulating media.

Since this is the function of the insulating strips, it will be noted that the dividing strips of insulating media need not be geometrically parallel to the mean current flow or to the line joining the connections, but must merely be sufficiently close to such a direction to prevent a flow of eddy currents in and about the normal spot to a substantial extent in a direction having a component parallel to the normal path.

With this in mind, the direction of the insulating media must extend transversely or across the normal path.

The insulating media may be embodied by any known insulating materials but is preferably helium and hence the division into strips by the insulating media, is provided by cuts or slots provided in the sheet and running generally transverse to the normal path. These cuts terminate short of the edges of the sheet 15, so that each strip of superconducting material defined by such slot or cut has a good superconducting connection to the remainder of the superconducting circuit to avoid critical field or current problems.

As an alternative to the above design, however, it will be realized that the superconducting strips could be separate strips with an insulating media such as air between, with the strips joined at each end to each other or to connecting members as long as suitable superconducting joints could be made. The barrier to this, at the present time, would usually be economy in the construction of an efficient joint.

In a further alternative, it will be noted that the sheet shown may be replaced by a sheet of different shape or might be replaced by a body in another form such as a plurality of strands of superconducting wire separated to provide air in between the strands and joined at the connections, the direction of the path P being arranged transverse to the strands. It will be noted that this might be a different and more easily normalizable wire than the wire used in the remainder of the circuit, or might be strands of the same wire wherein the thinness of the individual strands and spacing rendered them normalizable in their separated position when they are crossed at a location where it is desired to render them normal by the magnetic field but which strands, when tightly wound, together are not normalizable by the magnetic field in the other part of its normalizable path. Whatever the form of the body divided into strips by insulating media, it will be understood that the body will be formed of normalizable superconducting material.

It will be realized that since it is intended to prevent any currents from travelling about the normal spot and this is done by preventing them travelling along a line having a component parallel to the path, then the dividing lines of insulating media should be longer than the normal spot (i.e. must extend on both sides of the path) to prevent or inhibit the travel by any currents around the ends of the normalizable slots. It will be appreciated that within a given strip of superconducting material separated on each side by the insulating media, that eddy currents, about the normal spot, are prevented or inhibited from flowing if they cannot travel in the direction of the normalizable path and hence the design of the sheet and the spacing of the insulating media should be such that the width of the strips measured in the direction of the normalizable path is less than the maximum dimension of the normal spot measured in the same direction. For optimum results, the width of the strip should be as narrow as possible to provide as many barriers to eddy current flow, as possible.

I claim:

1. In means for producing magnetic fields having:

a magnet movable relative to a superconducting body; said magnet defining, in relation to its position and orientation, a predetermined field pattern; said superconducting body being located, in relation to said field pattern and said route to have, when in the superconducting state, a localized area thereof, rendered normal by said field, during the travel of said magnet along a certain part of said route, said magnet and said route being so located in relation to said body, that said area is movable across said body as said magnet moves through said part of said route;

a "normalizable" path defined by the locus of travel of said localized area across said superconductor; the maximum dimension of said normal area being smaller, measured along said path than the dimension of said body, measured along said path; the improvement comprising of constructing said body of a plurality of strips extending across said path;

said superconducting body being connected in a superconducting circuit;

said strips being separated by an insulating media;

and superconducting means, connecting said strips in parallel, beyond each end of such insulating media.

2. In means for producing magnetic fields as claimed in claim 1 wherein said insulating separations extend across said path, and wherein the width of the strips measured in the direction of the normalizable path is less than the maximum dimension of the normal area measured in the same direction.

3. In means for producing magnetic fields having:

a magnetic field movable about a closed route relative to a superconducting body; said magnetic field defining, in relation to its position and orientation, a predetermined field pattern; said superconducting body being located, in relation to said field pattern and said route to have, when in the superconducting state, a localized area thereof, rendered normal by said field, during the travel of said magnetic field along a certain part of said route, said magnetic field and said route being so located in relation to said body, that said area is movable across said body as said magnetic field moves through said part of said route;

a "normalizable" path defined by the locus of travel of said localized area across said superconductor; the maximum dimension of said normal area being smaller, measured along said path than the dimension of said body, measured along said path; the improvement of constructing said body of a plurality of strips extending across said path;

said superconducting body being connectable at each end in a superconducting circuit;

said strips being separated by an insulating media;

and superconducting means, connecting said strips in parallel to each said end, beyond each end of such insulating media.

4. In means for producing magnetic fields as claimed in claim 3 wherein said insulating separations extend across said path;

and wherein the width of the strips measured in the direction of the normalizable path is less than the maximum dimension of the normal area measured in the same direction.

5. In means for producing magnetic fields having:
a magnetic field movable about a closed route relative to a superconducting body; said magnet defining, in relation to its position and orientation, a predetermined field pattern; said superconducting body being located in relation to said field pattern and said route to have, when in the superconducting state, a localized area thereof, rendered normal by said field, during the travel of said magnetic field along a certain part of said route, said magnetic field and said route being so located in relation to said body, that said area is movable across said body as said magnetic field moves through said part of said route;
a "normalizable" path defined by the locus of travel of said localized area across said superconductor; the maximum dimension of said normal area being smaller, measured along said path than the dimension of said body, measured along said path; the improvement of constructing said body of a plurality of strips extending across said path;

said strips being separated by an insulating media; and superconducting means, connecting said strips in parallel, beyond each end of such insulating media.

6. In means for producing magnetic fields as claimed in claim 5 wherein said insulating separations extend across said path;
and wherein the width of the strips measured in the direction of the normalizable path is less than the maximum dimension of the normal area measured in the same direction.

References Cited

UNITED STATES PATENTS

| | | | |
|---|---|---|---|
| 2,577,707 | 12/1951 | Kerns et al. | 336—84 X |
| 3,200,299 | 8/1965 | Aulter | 317—158 |

BERNARD A. GILHEANY, *Primary Examiner.*

H. A. LEWITTER, *Assistant Examiner.*